United States Patent [19]
Crumrine

[11] Patent Number: 5,535,540
[45] Date of Patent: Jul. 16, 1996

[54] JIGGING SYSTEM APPARATUS

[76] Inventor: Douglas L. Crumrine, 5333 Lynden Ave., Grand Island, Nebr. 68801

[21] Appl. No.: 394,620

[22] Filed: Feb. 27, 1995

[51] Int. Cl.⁶ ............................................... A01K 85/00
[52] U.S. Cl. .................... 43/42.09; 43/42.39; 43/42.36
[58] Field of Search .......................... 43/42.09, 42.39, 43/42.28, 44.2, 44.8, 42.36

[56] References Cited

U.S. PATENT DOCUMENTS

| | | | |
|---|---|---|---|
| 3,608,228 | 9/1971 | Borresen et al. | 43/42.09 |
| 3,740,889 | 6/1973 | Scott | 43/42.09 |
| 4,054,004 | 10/1977 | Schott | 42/42.09 |
| 4,163,337 | 8/1979 | Kress | 43/42.36 |
| 4,777,757 | 10/1988 | de Marees van Swinderen | 43/42.36 |
| 5,129,175 | 7/1992 | Pixton | 43/42.36 |

FOREIGN PATENT DOCUMENTS 163584  8/1953  Australia .

OTHER PUBLICATIONS

Copy of Magazine article entitled "Worm Your Way to Bassing Success?" in *The Complete Sportsman's Fishing '95* vol. 7, No. 1, p. 31, authored by Darl Black, publication date unknown.

*Primary Examiner*—Joseph J. Hail, III
*Assistant Examiner*—Randolph S. Herrick
*Attorney, Agent, or Firm*—Law Office of John A. Beehner

[57] ABSTRACT

An improved weighted jigging system for use with a malleable lure body and a fishhook has a sinker body with front and rear portions and a bore for slidably receiving a fishing line. A hook locking device is adapted to be received and releasably secured within the bore, which locking device comprises a fishhook connection member for releasably engaging the fishhook eyelet such that the fishhook is releasably retained to the sinker body. The fishing line is adapted to be fastened to the fishhook eyelet such that upon engagement of the fishhook eyelet by the fishhook connection member of the fishhook locking device, a substantially unitary fishhook sinker apparatus is formed.

9 Claims, 2 Drawing Sheets

JIGGING SYSTEM APPARATUS

Background of the Invention

1. Technical Field

The present invention relates to fishing lures. More specifically, it relates to an improved jigging system apparatus wherein the jigging weight and or lure body may be changed out without the necessity of removing the hook from the line.

One of the more popular lures is commonly referred to as a "jig" In its simplest form, the jig comprises a "head" an eyelet formed on the head, and a hook, which is usually formed integrally therewith When fishing a "jig" it is up to the fisherman to create the motion designed to attract the fish. This is usually done by moving the fishing rod back and forth or up and down and allowing the lure to "bounce" and settle back to the bottom.

2. Description of the Prior Art

As is well understood in the fishing art, the effectiveness of a given fishing lure in catching fish is due in large part to the presentation made by the lure to the fish. What is commonly referred to as presentation concerns the manner in which the lure appears to the fish. Obviously the more natural the appearance or presentation of the lure to the fish, the more likely the fish will think it is food and the more effective the lure will be in catching fish.

While at one time it was thought that fish could see a lure in the same manner as humans, i.e. its color, etc., it is now believed that a fish is merely aware of the lure's presence, its movement and perhaps its shape. Thus, in order for a lure to make a realistic presentation to the fish, it must be of a shape and movement to simulate something edible to the fish.

As mentioned above, jigs are fished by moving the rod up and down or back and forth causing the lure to "bounce" off the bottom. In between movements of the rod, the lure is allowed to rest temporarily on the bottom. During this "resting" time, it is important that the lure assume a realistic position on the bottom. When using artificial bait such as plastic worms or grubs, this means that the bait should remain essentially vertical when resting on the bottom. This is a problem with conventional jigs which do not assume a vertical orientation when resting on the bottom. Conversely, the design of the present jigging system urges the lure into a vertical stance when it drops to the bottom.

On a practical level, in order to be usable as a fishing lure, the lure must not only make a realistic presentation to the fish but must also be capable of avoiding snags and other underwater entanglements. A lure which is highly effective in presentation does no good to the fisherman if it becomes entangled in underwater obstacles and incapable of being retrieved on every other cast. Additionally, there is nothing more frustrating to a fisherman than to have his line continuously snag.

Another consideration is to provide a lure having sufficient weight to allow it to be cast into proper position. However, the weight must be fashioned in a shape which does not adversely affect the appearance of the lure. The present invention discloses a unique lure which provides both snag avoidance and a means for making a realistic presentation to a fish. The lure also provides a means for the fisherman to adjust his technique to find the optimum lure configuration combination.

Another practical consideration in development of fishing lures is the flexibility a fisherman has to alter presentation techniques. As is well understood in the art, the environmental conditions such as temperature, light levels, etc. will have a great impact on which lure works on a given day. Thus, in order for the fisherman to achieve maximum effectiveness, he must experiment with different presentations before finding the right combination. Generally, this means that one lure must be taken off of the line and another one installed. Clearly, this involves a fair amount of time and effort, especially when a large number of options need to be tried. The lure of the present invention minimizes this amount of time which is necessary for the fisherman to change presentations. This is accomplished by allowing the fisherman to change portions of the lure such as the amount of weight, thereby altering presentation, without the need for completely removing the lure from the line.

Current jigging systems comprise essentially a leaded jig head which serves as the weight for the lure. A hook, generally formed integrally with the weighted jig head, protrudes therefrom. Additionally, an eyelet of some sort is formed with the jig head to provide a means for connection with a fishing lure. An artificial lure such as a plastic grub or the like is then threaded onto the hook to complete the lure. Clearly, this type of prior art jigging system requires complete removal from the fishing line in order to change lure weights.

Therefore, there exists a strong need in the fishing art for a jigging system wherein features such as the weight may be altered without removing the entire lure from the line.

Consequently, it is a primary objective of the present invention to provide a unique jigging system adapted for interchangability of the weight associated therewith, without the need for removing the entire lure from the line.

It is a further objective of the jigging apparatus of the present invention to provide a system which is capable of altering its presentation without the need for removing the complete lure from the fishing line.

It is a further objective of the present invention to provide a jigging system wherein the hook and sinker associated therewith may be releasably secured thereto.

It is a further objective of the jigging system of the present invention to provide an apparatus wherein the lure falls in a generally vertical direction in the water.

It is a further objective to provide a jigging system wherein the lure acquires and maintains a generally vertical position on the bottom of the fished area.

It is a further objective of the present invention to provide a jigging system which is resistant to snagging on underwater obstacles.

A final objective of the present invention is to provide a unique jigging system which may be constructed using environmentally friendly materials.

Summary of the Invention

An improved weighted jigging system for use with a malleable lure body and a fishhook having a U-shaped hook with a pointed barb on a free end thereof, a shank extending from the other end of the hook and terminating in an eyelet for connection of the fishhook to a fishing line. The jigging apparatus has a sinker body having front and rear portions and a bore for slidably receiving the fishing line therethrough. A hook locking device is adapted to be received and releasably secured within the sinker body bore. The fishhook locking device further comprises a fishhook connection member for releasably engaging the fishhook eyelet such that the fishhook is releasably retained to the sinker body. The fishing line is adapted to be fastened to the fishhook eyelet such that upon fastening of the fishing line to the eyelet, and upon engagement of the fishhook eyelet by the fishhook connection member of the fishhook locking device, a substantially unitary fishhook sinker apparatus is formed.

DESCRIPTION OF THE PREFERRED EMBODIMENT

Figure 1:
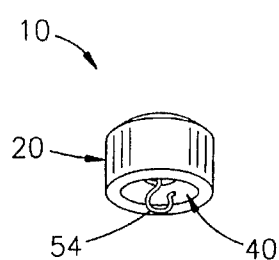
FIG. 1 is a bottom perspective view of the jigging system of the present invention.
Figure 2:
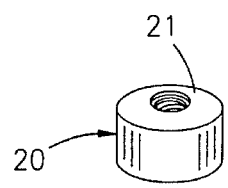
FIG. 2 is a top perspective view of the jigging system of the present invention.

FIG. 1 and 2 are bottom and top perspective views respectively of the jigging system of the present invention. As seen in these figures, the jigging apparatus 10 comprises essentially a sinker body 20 and a hook connection means 50 associated therewith. The sinker body 20, in the preferred embodiment, is a generally cylindrical shape having a generally flat top surface in forward portion 21 and an indentation or recess 40 in the rear portion 41 thereof. An axial bore 30 is placed therethrough for slidable reception of a fishing line 60. Since the line is tied to the hook 90 and not the sinker 20, there is no stress placed on the sinker by the line.

Figure 3:
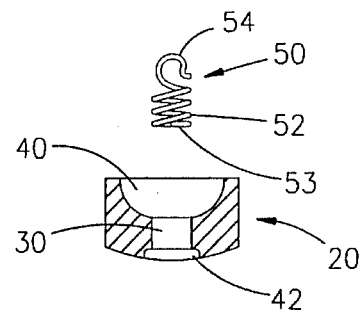
FIG. 3 is an exploded view of the jigging system of the present invention.
Figure 4:
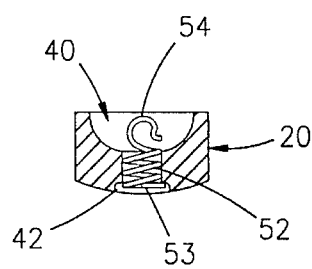
FIG. 4 is a side cross-sectional view of the present invention in the assembled configuration.

The internal details and interconnection of the hook locking means 50 is more clearly shown in the side sectional views of FIGS. 3 and 4. As seen in these figures, the axial bore 30 extends lengthwise throughout sinker body 20 intersecting recess 40 in the rear portion 41 thereof such that a fishing line may pass entirely therethrough. As is also clearly shown in FIGS. 3 and 4, the sinker body 20, and in particular axial bore 30, is adapted to receive hook locking means 50 therein. As seen from the figures, hook locking means 50 comprises a coiled portion 52 for securement in bore 30 and a J-shaped connector 54 for engaging hook 90. In the preferred embodiment, the coiled portion 52 and J-connector portion 54 would be formed from a single piece of wire. Additionally, the diameter of bore 30 is sufficiently large that when hook 90 is not engaged with connector 54, sinker body 20 may be slid past hook 90. Therefore, sinker body 20 may be changed without removing the hook. This permits the size of sinker body 20, and consequently its weight, to be changed to fit the size of the bait used.

As may be seen in the figures, the diameter of axial bore 30 is slightly smaller than the diameter of coiled portion 52. Thus, a substantially friction-tight fit is achieved therebetween when the coiled portion 52 is wound sufficiently to reduce its diameter to be threadably received within bore 30.

Also shown in the figures is an additional indentation 42 which is positioned in the forward portion 21 of sinker body 20. It will be noted that indentation 42 has a diameter which is slightly larger than that of axial bore 30. The purpose for indentation 42 is to provide a means for receiving the lip portion 53 of coil 52 on hook locking means 50. Indentation 42 and its connection with lip portion 53 of coil 52 provides additional locking stability in that removal of hook locking means 50 is prevented due to contact between the lip portion 53 and the ledge provided by indentation 42. As is clear from the view of FIG. 4, when hook locking means 50 is completely received within axial bore 30, the J-shaped connector 54 of hook locking means 50 extends into recess 40 in the rear portion 41 of sinker body 20. This enlarged recess 40 permits installation of the conventional fishing hook 90 onto the J-shaped connector 54. This installation is most clearly shown in FIG. 5.

Figure 5:
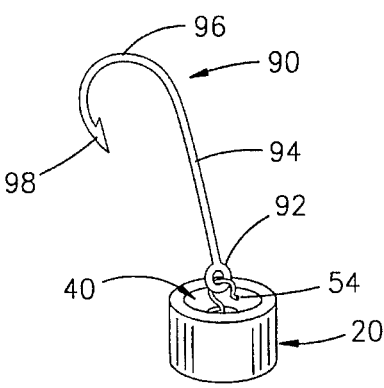
FIG. 5 is a perspective view of the jigging system of the present invention with a conventional hook releasably secured thereto.

FIG. 5 is a bottom perspective view of the improved jigging system showing the installation of a conventional fishhook thereon. As indicated above, J-shaped connector on hook locking means 50 is adapted to receive an eyelet 92 of a conventional fishhook 90. Due to the connection between the J-shaped connector 54 and the eyelet 92 of hook 90, hook 90 is substantially locked to the jigging apparatus 10. While sufficient room exists within recess 40 for the eyelet 92 of hook 90 to be disengaged from the J-connector 54, disconnection is unlikely to occur inadvertently. Rather, a significant manual manipulation of the hook is required to facilitate disengagement therefrom. Thus, once hook 90 is engaged with locking apparatus 10, a substantially unitary lure is created. Furthermore, the design allows artificial lures to be "Texas rigged" as illustrated and discussed below.

Figure 6:
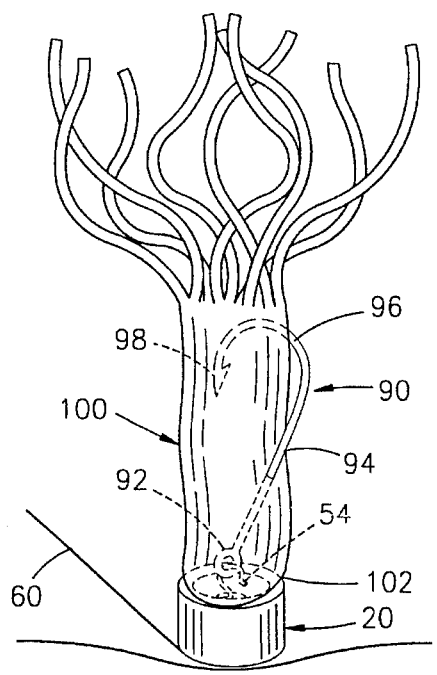
FIG. 6 is a perspective view of the jigging system of the present invention in its operational configuration showing a tube lure secured thereto.

FIG. 6 is a perspective view of the improved jigging apparatus 10 of the present invention in one of its working embodiments. This first working embodiment, illustrated in FIG. 6, is identified by the external positioning of sinker body 20 relative to the lure 100 having forward and rearward portions 102 and 104 respectively. In this embodiment, use of the jigging system is shown in connection with a lure 100 referred to in the art as a tube, due to its hollow nature. In this embodiment, the forward portion 102 of the hollow tube 100 is positioned adjacent and within the recess 40 provided in the rear portion 41 of sinker body 20. The J-connector 54 then extends into the hollow portion of lure 100 where it engages eyelet 92 of hook 90. The initial top portion of the shank 94 adjacent eyelet 92 is contained within the hollow portion of the tube 100. At about the halfway point of shank 94, it exits the tube body until approximately the halfway point on bend 96 whereupon the hook in reinserted into tube 100 such that the point and barb 98 of hook 90 reside within the hollow portion thereof. Thus, it will be clear from FIG. 6 that this embodiment of the present invention provides a substantially weedless configuration in that the hook and barb portion of hook 90 is within the tube 100 and thus not exposed for contact with underwater obstacles.

As mentioned above, presentation of the lure is extremely important in achieving success. Obviously, the presentation should mirror as closely as possible the natural appearance of the bait. In the case of bait such as worms and grubs, this means they should be oriented vertically with respect to the bottom surface. It will be observed from FIGS. 6–9, illustrating the working embodiments of the invention, that the operation of the jigging system naturally places the lure in a vertical position on the bottom, enhancing its presentation to the fish. This results from placement of sinker 20 at the "head" of the bait causing it to drop vertically in the water. In addition to a more realistic presentation, the vertical orientation enhances visibility.

Figure 7:
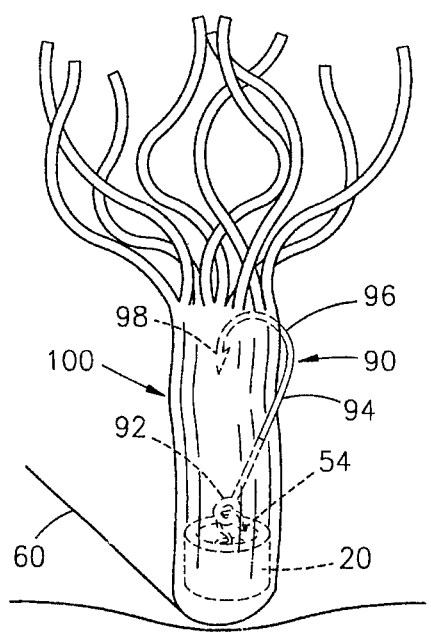
FIG. 7 is a perspective view of an alternative operational configuration of the jigging system of the present invention with the sinker positioned internally of the tube lure.

Another embodiment of the present invention is illustrated in FIG. 7. It will be observed from the embodiment of FIG. 7 that the main difference between it and that of FIG. 6 is the internal positioning of sinker body 20 within tube 100. Again, the initial portion of hook 90 resides within tube 100 and exits body 100 at approximately the halfway point on shank 94. The point and barb 98 are reinserted in tube 100 in a manner similar to that illustrated in FIG. 6.

Figure 8:
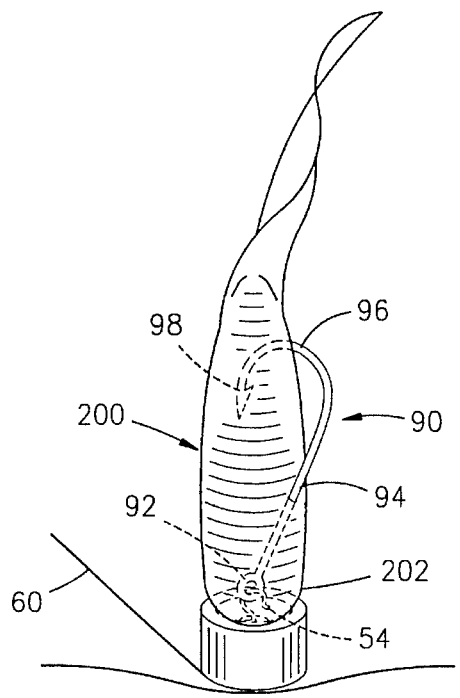
FIG. 8 is a perspective view of the jigging system of the present invention in another operational configuration utilizing a plastic grub.
Figure 9:
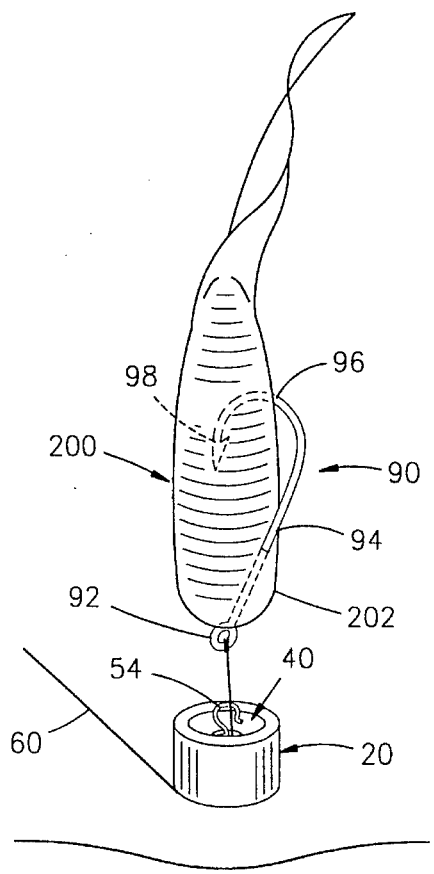
FIG. 9 is a perspective view of yet another alternative embodiment of the present invention wherein the hook is not releasably secured to the sinker.

FIGS. 8 and 9 illustrate alternative embodiments of the present invention wherein the jigging apparatus is used with a lure commonly referred to in the art as a "grub" 200 having forward and rearward portions 202 and 204 respectively. As is well understood, such grub lures are especially well suited for use on crappie. The configuration illustrated in FIG. 8 is very similar to that in FIG. 6 wherein the forward portion 202 of grub 200 is positioned within recess 40 of sinker body 20. It will be understood in the art that grub 200 is solid and therefore an internal positioning of sinker body 20 similar to that shown in FIG. 7 is not possible with a grub 200. As seen in FIG. 8, the eyelet 92 and upper portion of shank 94 is inserted in grub body 200 and exits the body at approximately the halfway point of shank 94. Similar to the embodiments discussed above, the point 98 of hook 90 is then reinserted into grub 200 to provide a substantially weedless lure.

A final embodiment is illustrated in FIG. 9 wherein the eyelet 92 of hook 90 is not engaged by J-connector 54 on hook connection means 50. Rather, hook 90 is positioned some distance away from sinker body 20 and associated hook connection means 50.

Figure 10:
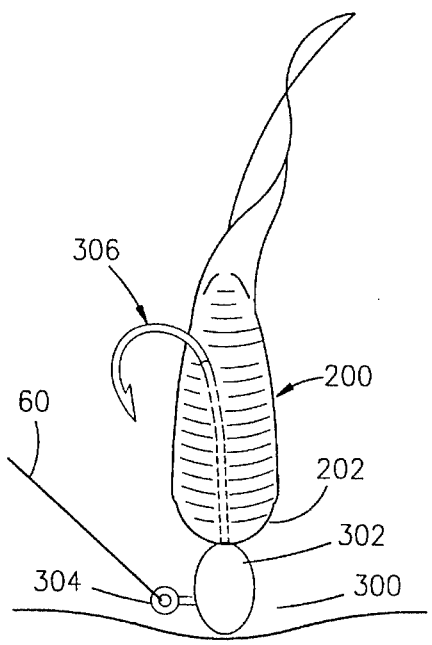
FIG. 10 is a view of a prior art jig used with a grub lure.
Figure 11:
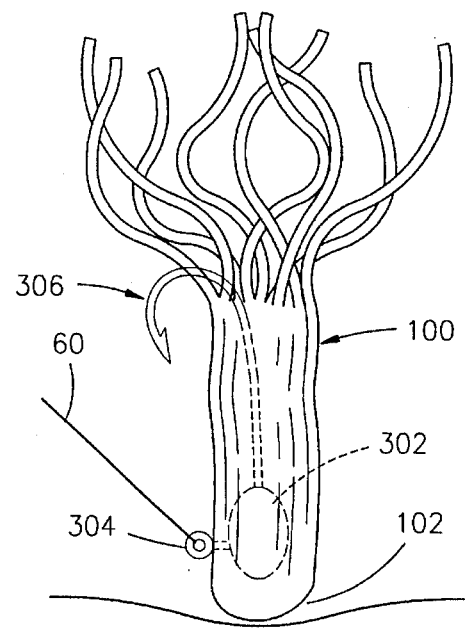
FIG. 11 is a side view of a prior art jig used with a tube lure.

Finally, FIGS. 10 and 11 illustrate prior art embodiments wherein a jig 300 comprises a jig head 302 functioning as the weight of the system. An eyelet 304 is secured to jig head 302 for connection to a fishing line. A hook 306 extends outwardly from head 302 and onto which a grub 200 may be installed as shown. FIG. 11 illustrates the use of a conventional jig 300 with a tube 100 as discussed above. As seen in this embodiment, the jig head 302 is positioned internally of tube body 100 in the hollow cavity as discussed above. Eyelet 304 projects outwardly from tube body 100 providing a mechanism for connection to the fishing line. Finally, hook 306 extends outwardly from head 302 into the tube body 100 where it may be exited and reinserted as discussed above. As is well known in the art, conventional jigs do not employ the highest quality hooks. The present invention allows the fisherman to use his favorite hook and plastic bait.

It is apparent that numerous other modifications and variations of the present invention are possible in view of the above teachings. For example, the size and shape of the sinker body may be changed in accordance with the size of the artificial bait being used. Additionally, the type of artificial lure used with the jigging system obviously is not limited to plastic tubes or grubs. Rather, many varieties of artificial bait such as worms, crawdads, lizards and the like, are equally well suited for use in conjunction with the jigging system. Still further, almost any type of hook may be used with the jigging system thus allowing the fisherman to use his favorite hook/bait combination.

Therefore it is to be understood that the above description is in no way intended to limit the scope of protection of the claims and is representative only of the several possible embodiments of the present invention.

There has thus been shown and described an invention which accomplishes at least all of the stated objects.

I claim:

1. An improved weighted jigging system for use with a malleable lure body and a fishhook having a U-shaped hook with a pointed barb on a free end thereof, a shank extending from the other end of the hook and terminating in an eyelet for connection of the fishhook to a fishing line, the jigging system comprising:

a sinker body having front and rear portions and a bore for slidably receiving said fishing line therethrough;

fishhook locking means adapted to be received and releasably secured within said sinker body bore, said fishhook locking means further comprising a fishhook connection member for releasably engaging said fishhook eyelet such that said fishhook is releasably retained to said sinker body; and said fishhook connection member of said fishhook locking means being releasably connectable to said fishhook eyelet such that upon fastening of said fishing line to said eyelet, a substantially unitary fishhook sinker system is formed.

2. The improved jigging system of claim 1 wherein said fishhook locking means comprises a spring having a coiled portion and said fishhook connection member comprises an opposite "J" shaped connector portion adapted for engagement with said fishhook eyelet, said coiled portion having a diameter slightly larger than said sinker bore such that, upon coiling of said spring in a direction to reduce the diameter of said coiled portion, said coiled portion is insertable into said bore for frictional fit therein.

3. The improved jigging system of claim 1 wherein said sinker body front portion further comprises a circumferential indentation surrounding said bore adapted to engage said fishhook locking means upon insertion of said fishhook locking means in said sinker body bore.

4. In combination:

a fishing line, a fishhook having an eyelet for connection of said fishing line to said fishhook; and an improved jigging system for use with a bait having;

a sinker body having front and rear portions and a bore for slidably receiving said fishing line therethrough, said sinker body having an indentation for partially receiving said bait therein;

fishhook locking means adapted to be received and releasably secured within said bore, said fishhook locking means further comprising a fishhook connection member for releasably engaging said fishhook eyelet such that said fishhook is releasably retained to said sinker body; and said fishing line adapted to be fastened to said fishhook eyelet such that upon fastening of said fishing line to said eyelet, and upon engagement of said fishhook eyelet by said fishhook connection member of said fishhook locking means, a substantially unitary fishhook sinker system is formed.

5. The combination of claim 4 wherein said bait further comprises an artificial bait having front and tail portions and adapted for receiving said fishhook substantially at said head of said bait such that upon fastening of said bait to said fishhook, said head of said artificial bait may be received in said indentation in said sinker body rear portion.

6. The combination of claim 5 wherein said artificial bait is a tube lure having a hollow center.

7. The combination of claim 5 wherein said artificial bait is a grub.

8. The combination of claim 4 wherein said artificial bait is a tube lure having a hollow center and wherein said sinker body is adapted to be received within said tube hollow center.

9. An improved jigging system for use with a fishhook having an eyelet for connection to a fishing line, the jigging system comprising:

a sinker body having front and rear portions and a bore for slidably receiving said fishing line therethrough;

hook locking means received and releasably secured within said bore, said hook locking means comprising a hook connection member for releasably engaging said hook eyelet such that upon engagement of said eyelet by said connection member, said hook is releasably retained to said sinker body; and said hook connection member of said hook locking means being releasably connectable to said hook eyelet such that upon fastening of said fishing line to said eyelet, a substantially unitary hook sinker apparatus is formed.

* * * * *